United States Patent [19]
Doyle et al.

[11] Patent Number: 6,108,605
[45] Date of Patent: Aug. 22, 2000

[54] LOW DISTORTION DIGITALLY CONTROLLED TRANSMITTER FOR USE IN A WELL LOGGING TOOL

[75] Inventors: Mark R. Doyle; Otto N. Fanini, both of Houston, Tex.

[73] Assignee: Western Atlas International, Inc., Houston, Tex.

[21] Appl. No.: 09/212,171

[22] Filed: Dec. 16, 1998

[51] Int. Cl.⁷ ........................................................ G01L 3/38

[52] U.S. Cl. .............................................. 702/7; 324/339

[58] Field of Search ...................... 702/7; 324/338–343

[56] References Cited

U.S. PATENT DOCUMENTS

| | | | |
|---|---|---|---|
| 4,439,831 | 3/1984 | Sinclair | 702/7 |
| 5,452,761 | 9/1995 | Beard et al. | 324/339 |
| 5,781,436 | 3/1984 | Forgang et al. | 702/7 |

*Primary Examiner*—Donald E. McElheny, Jr.
*Attorney, Agent, or Firm*—Darryl M. Springs

[57] ABSTRACT

A system and method for controlling the transmitted signal for use in a well logging tool, using an iterative method (preferably the method of steepest descent) such that the transmitted signal more closely resembles a desired waveform.

20 Claims, 7 Drawing Sheets

LOW DISTORTION DIGITALLY CONTROLLED TRANSMITTER FOR USE IN A WELL LOGGING TOOL

BACKGROUND AND SUMMARY OF THE INVENTION

The invention is related generally to the field of electromagnetic induction resistivity well logging, and specifically to methods which require generation of a precisely-specified periodic signal downhole.

Background: Well Logging

Electromagnetic induction resistivity well logging instruments are well known in the art. Electromagnetic induction resistivity well logging instruments are used to determine the electrical conductivity of earth formations penetrated by a well bore. Measurements of the electrical conductivity are used for, among other things, inferring the fluid content of the earth formations. (Lower conductivity, or higher resistivity, is associated with hydrocarbon-bearing earth formations.)

The physical principles of electromagnetic induction resistivity well logging are described, for example, in H. G. Doll, *Introduction to Induction Logging and Application to Logging of wells Drilled with Oil Based Mud,* Journal of Petroleum Technology, vol. 1, p. 148, Society of Petroleum Engineers, Richardson Texas (1949). Many improvements and modifications to electromagnetic induction resistivity instruments have been devised since publication of the Doll reference, supra. Examples of such modifications and improvements can be found, for example, in U.S. Pat. Nos. 4,837,517, 5,157,605, 5,452,762, all of which are hereby incorporated by reference.

Background: Transverse Electromagnetic Induction Well Logging

In U.S. Pat. No. 5,781,436 issued to Forgang et al. a method for measuring the conductivity of earth formations penetrated by a well bore is described. The method of Forgang et al. involves selectively passing an alternating current through transmitter coils inserted into the wellbore. At least one of the transmitter coils has a magnetic moment direction different from the magnetic moment direction of the other ones of the transmitter coils. The alternating current includes a first and a second frequency where the amplitude of the alternating current at the first frequency has a predetermined relationship to the amplitude of the alternating current at the second frequency. Voltages induced in a receiver coil, having a magnetic moment along a direction substantially parallel to the magnetic moment direction of the transmitter coil through which the alternating current is passed, are selectively received. A difference in magnitudes between a component of the received voltage at the first frequency and a component of the received voltage at the second frequency is measured. The conductivity is calculated from the difference in the magnitudes at the induced frequencies as compared to the difference in magnitudes at the transmitted frequencies.

Background: Phase and Harmonic Distortions in Transmitted Signal

Because the difference in magnitudes at the received frequencies is compared to the difference in the amplitudes at the frequencies in the transmitted frequencies, the transmitted frequencies and their amplitudes must either be measured or carefully held to a known form.

However, precision electronics in a downhole sonde presents some unique challenges. Due to the net upward flow of heat in the Earth, the temperature can be very high in deep boreholes, and is commonly 175 degrees Celsius or higher. (Electronics are often enclosed in thermal insulation, so that the temperature of the electronics can be less than that in the borehole; but this enclosure merely slows the rate of change of temperature seen by the electronics.) Moreover, since the temperature varies with depth, it can change very significantly as a sonde is lowered during logging operations. Pressure also changes very significantly with depth.

This harsh environment presents problems for electronics. Some components, which would be stable at a known value while on the surface, are not stable inside the wellbore. Thus downhole generation of a precisely specified RF power output has proven difficult. The unpredictable change in component behavior can lead to phase and harmonic distortions in the transmitted signal. (A major cause of these distortions is non-linearity in the power amplifier.)

In some conventional induction logging techniques, the transmitted signal was simply sampled to precisely determine what transmitted signal had led to the received waveform. The properties of the rock formation were then sought to be derived from this information.

However, such methods are not satisfactory with the Forgang et al. method (U.S. Pat. No. 5,781,436). The non-linearity of the amplifier introduces frequency harmonics and beat frequencies into the signal, thereby corrupting it. Although the prior art methods have worked acceptably well for sinusoidal and even square wave signals passed through the transmitter, those methods have proven inadequate when dealing with the particular waveform desired to be generated by the logging instrument shown in the Forgang et al. patent. Therefore, providing precise control of the transmitted signal would be desirable.

Low Distortion Digitally Controlled Transmitter

The present application discloses a new method for generating precisely specified waveforms downhole. Thus instead of requiring refined filtering methods to recover the effects of propagation through the formation, the present invention provides a technique for precision transmittal downhole, whereby the transmitted waveforms can be optimized for easy analysis. This is moving in the opposite direction from the prior art, in which receiver optimization is emphasized more than transmission optimization.

The present application discloses a system and method to control a transmitter so that the transmitted signal is substantially identical to a specified, desired, periodic waveform such as would be required for well logging. In the context of well logging, the prior art uses a detection algorithm with a reference receiver, but the innovative teachings of the present application use a control algorithm to adjust the transmitted signal. The transmitted signal is sampled and compared to the desired signal. The template of the samples of the waveform to be transmitted is then modified so that amplitudes that are deficient are enhanced and those that are excessive are reduced. Because both sine and cosine components are adjusted, phase shifts in the output filter and power amplifier are corrected, as well as are gain errors. Harmonics introduced by the non-linearities in the transmitter are also corrected by the addition of harmonics of opposite polarities into the template. The adjustment of the template is performed for example using a novel combination of steepest descent adaptation of the sine and cosine amplitudes along with simultaneous determination of the parameters of the analog output filter and power amplifier.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Definitions

Amplifier: a device for increasing the magnitude of a signal, ideally without changing the shape of the signal's waveform Analog: of or pertaining to the general class of devices or circuits in which the output varies as a continuous function of the input.

Analog Representation: a representation that does not have discrete values, but is continuously variable.

Analog Signal: an electrical signal that varies continuously. A voltage level that changes in proportion to the change in a physical variable.

Analog-to-Digital Converter: a device that translates analog signals (voltages, pressures, etc.) into numerical digital from (binary, decimal, etc.).

Digital Signal: an electrical signal with two states (on or off, high or low, positive or negative) such as could be obtained from a telegraph key or two-position toggle switch. Digital normally means binary or two-state.

Digital Signal Processor (DSP): DSPs, as implemented in very-large-scale integration (or "VLSI") circuits, are ideally suited to uses which require resources beyond the abilities of general-purpose computers. Such uses include processing of large amounts of data or where manipulation of data requires a high sampling rate or higher resolution per sample. A "host DSP" is a general-purpose DSP designed to accommodate a wide range of processing applications. As such, it offers a speed increase over general-purpose computers.

Digital-to-Analog Converter (DAC): a computing device that converts a digital signal into a voltage or current whose magnitude is proportional to the numeric value of the digital signal.

Earth Formations: a bed or deposit composed throughout of substantially the same kind of rock; often a lithologic unit.

Fourier Series Representation: a mathematical analysis that allows any waveform to be represented as a sum of sines and cosines.

Steepest Descent: a mathematical algorithm for determining an optimum value.

Well Logging: the recording of information about subsurface geologic formations, including records kept by the driller and records of mud and cutting analyses, core analysis, drill stem tests, and electric, magnetic, acoustic, and radioactivity procedures.

Overview of Innovative Features

Figure 6:
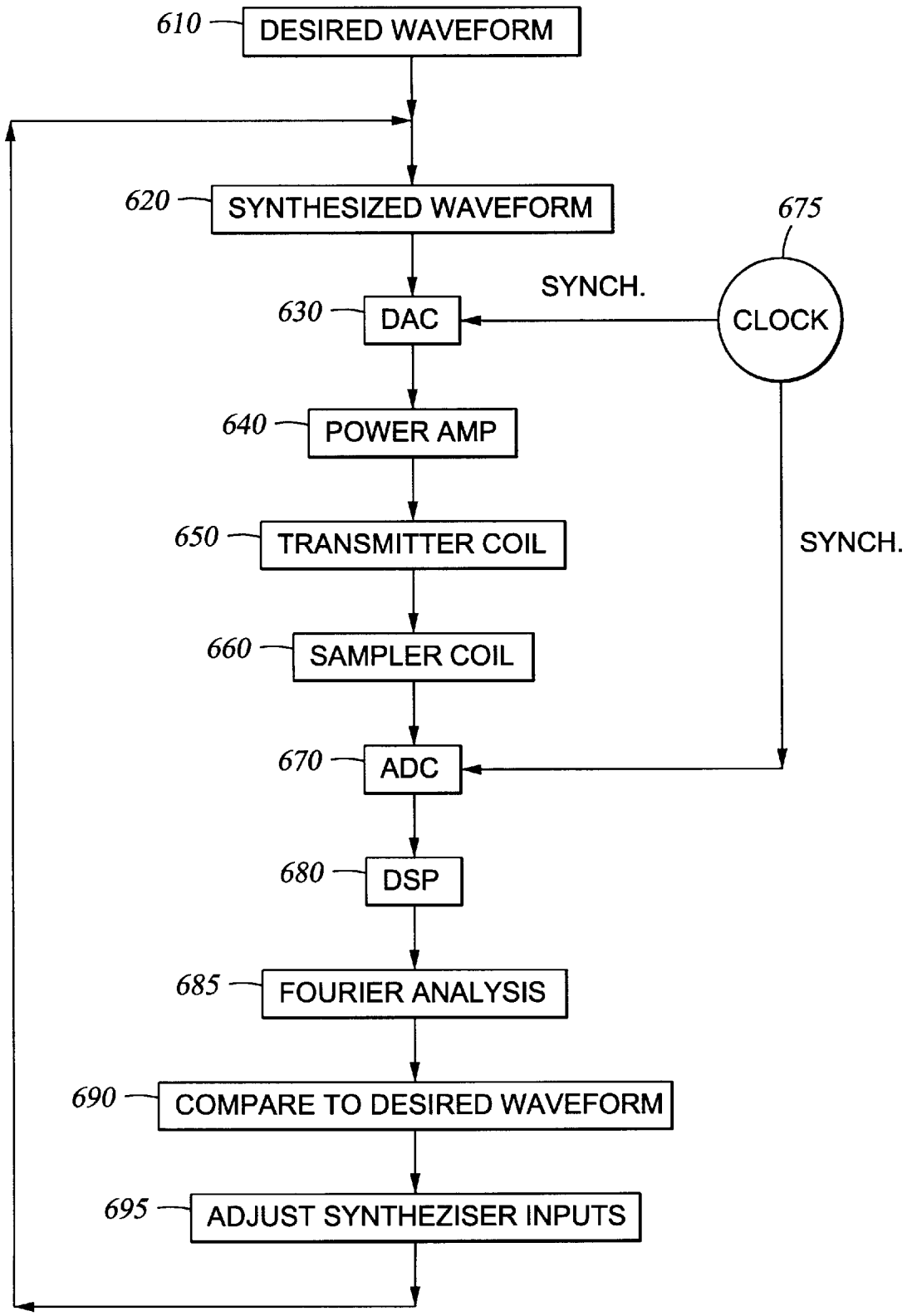
FIG. 6 shows a flow chart of the method of synthesizing a desired waveform.

The present application discloses a system and method to control a transmitter so that the transmitted signal is substantially identical to a specified, desired, periodic waveform such as would be required for well logging. Referring to FIG. 6 which is a flow chart of the presently preferred method, first specify a desired periodic waveform (step 610) in its Fourier series representation as a set of sine and cosine amplitudes $\{A_k, B_k\}$ at the fundamental frequency and its harmonics. Next, synthesize the desired waveform (step 620) and then convert the synthesized waveform into an analog signal (step 630) using the digital-to-analog converter (DAC). The analog signal is then amplified (step 640) using a power amplifier and transmitted (step 650) through the transmitter coil. The transmitted signal is then sampled (step 660) in the sampler coil and converted back into a digital signal (step 670) using an analog-to-digital converter (ADC). The DAC and ADC are synchronized to each other (step 675). The ADC sends the digitized signal to the digital signal processor (DSP) (step 680). A Fourier Analysis is then performed on the digitized signal to reduce the signal into its sine and cosine components (step 685). The resulting components are then compared (step 690) to the desired waveform and the synthesizer inputs adjusted (step 695). A new waveform is then synthesized (step 620) and the process is repeated until the output substantially resembles the desired waveform when the two are compared (step 690).

In the context of well logging, although a surface calibration may be performed (as is the case conventionally), the signal tuning is performed down hole. That is, the innovative tuning described herein is NOT the same as the conventional calibration procedure. The conventional calibration procedure is preferably still performed, The tuning is preferably performed down hole because down hole is a hot environment and the tuning changes with the distance down the hole (which is not and cannot be calibrated). The instruments for performing the novel teachings of the present application are placed at least partly in the flask to reduce thermal compliance. The preferred method disclosed herein can operate in temperature up to at least 175C., or higher as device technologies may allow.

The method of tuning the output waveform will be further described after a description of the associated hardware for implementing the method in the context of well logging. However, the innovative methods and hardware configurations are not limited to well logging, as will be obvious to those skilled in the relevant art.

Well Logging Instrument

Figure 5:
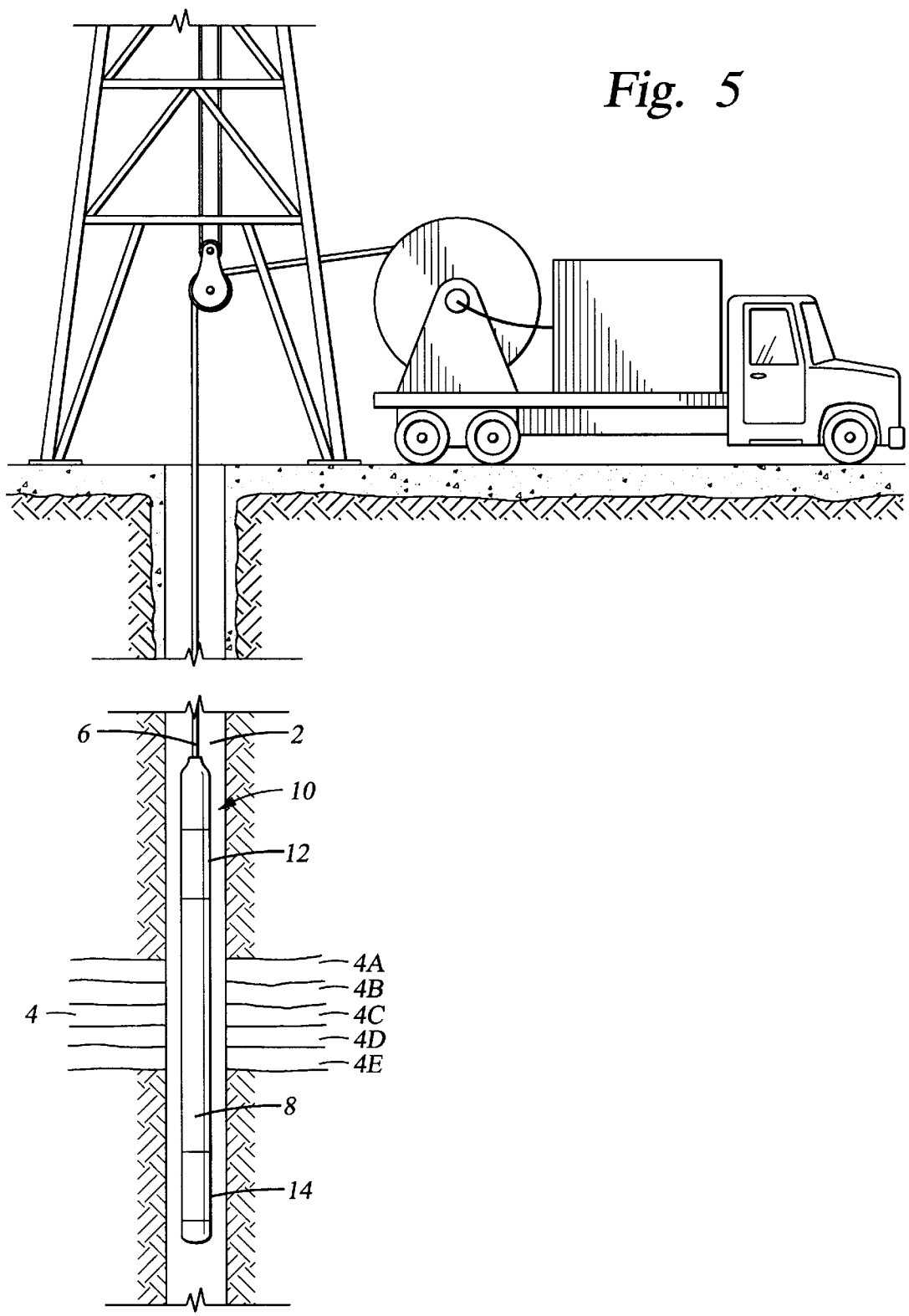
FIG. 5 depicts an induction instrument disposed in a well bore penetrating earth formations.

FIG. 5 shows an electromagnetic induction resistivity well logging instrument 10 disposed in a wellbore 2 drilled through earth formations 4 which are shown generally. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14;

and a receiver/signal processing/telemetry electronics unit 12 attached to the other end of the coil mandrel unit 8, this unit 12 typically being attached to the cable 6.

The coil mandrel unit 8 includes induction transmitter and receiver coils, for inducing electromagnetic fields in the earth formations 4 and for receiving voltage signals induced by eddy currents flowing in the earth formations 4 as a result of the electromagnetic field induced therein.

The auxiliary electronics unit 14, can include a signal generator and power amplifiers to cause alternating currents of selected frequencies to flow through transmitter coils in the coil mandrel unit 8.

The receiver/signal processing/telemetry electronics unit 12, can include receiver circuits for detecting voltages induced in receiver coils in the coil mandrel unit 8, and circuits for processing these received voltages into signals representative of the conductivities of various layers, shown as 4A through 4E of the earth formations 4. As a matter of convenience for the system designer, the receiver/signal processing/telemetry electronics unit 12 can include signal telemetry to transmit the conductivity related signals to the earth's surface along the cable 6 for further processing, or alternatively can store the conductivity related signals in an appropriate recording device (not shown) for processing after the instrument 10 is withdrawn from the wellbore 2.

Transmitter Coils

Figure 4A:
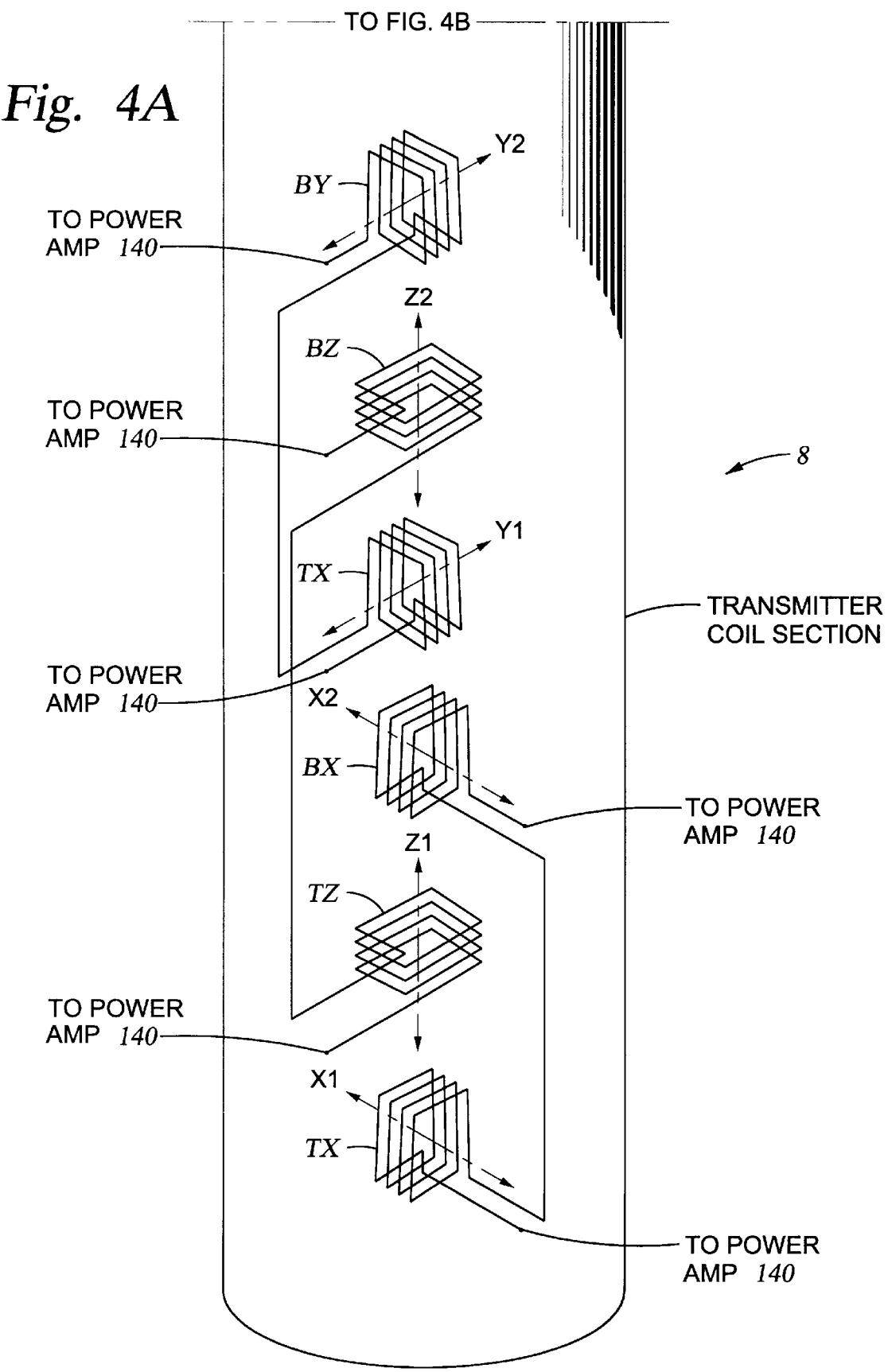
FIG. 4A shows a diagram of the transmitter coil section.
Figure 4B:
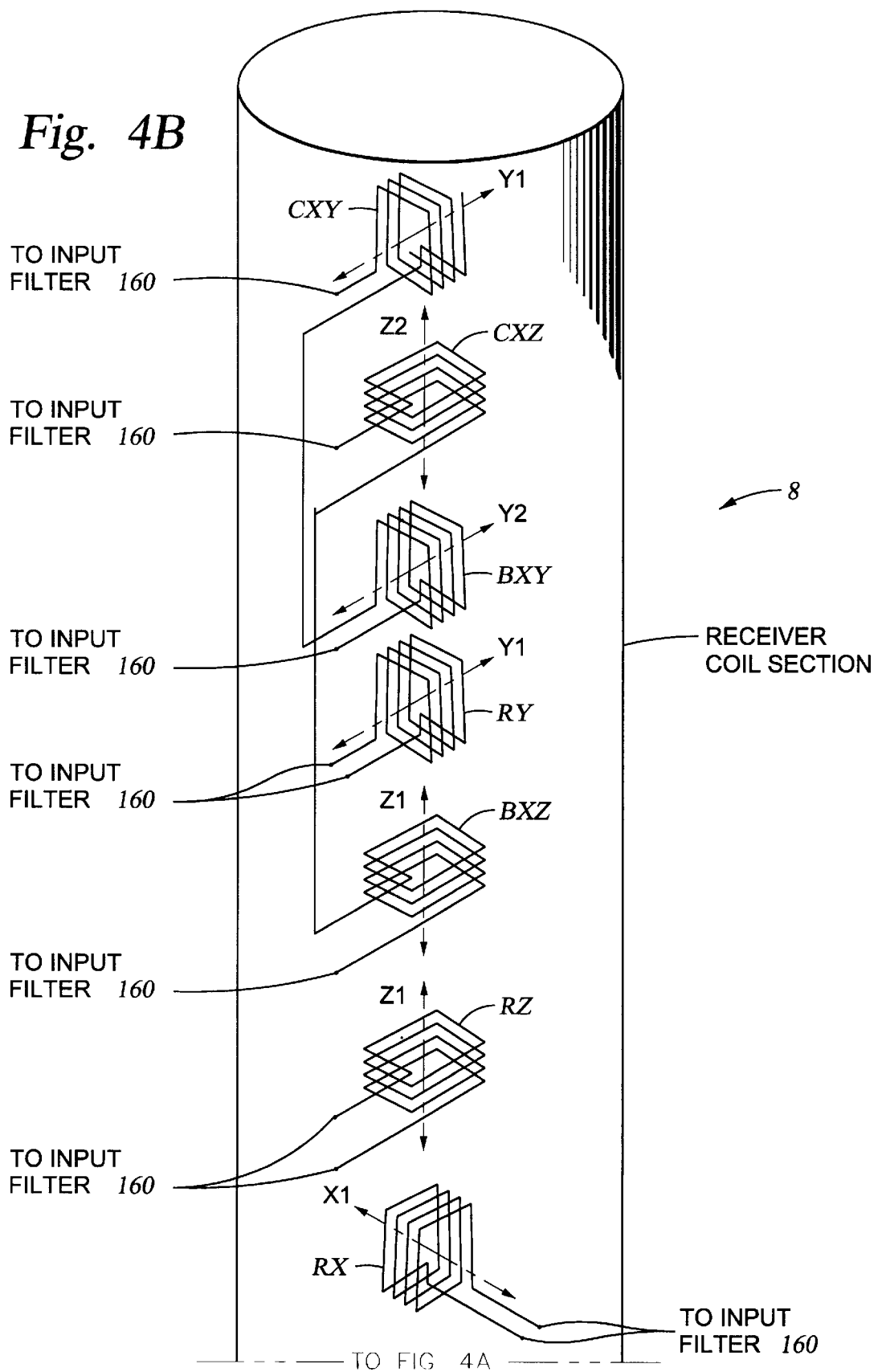
FIG. 4B shows a diagram of the receiver coil section.

The arrangement of transmitter coils and receiver coils on the coil mandrel unit 8 can be better understood by referring to FIGS. 4A and 4B. The transmitter coil section of the coil mandrel unit 8 is shown in FIG. 4A. A transmitter coil which can be wound so that its axis, and thereby its magnetic moment, is along an axis X1 is shown at TX. Axis X1 by convention will be referred to as being perpendicular to the axis of the instrument (10 in FIG. 5). Coil TX can be electrically connected to the output of one of the power amplifiers (such as 140 in FIG. 1). When alternating current flows through transmitter coil TX, an alternating electromagnetic field is induced, which causes eddy currents to flow in "ground loops" in the wellbore (2 in FIG. 5) and in the earth formation (4 in FIG. 5) substantially coaxially about axis X1 and parallel to the axis of the mandrel unit 8 and the instrument (10 in FIG. 5). Other transmitter coils are configured similarly, but have their magnetic moment oriented along other directions as will be obvious to those skilled in the art.

Receiver Coils

A suitable arrangement of receiver coils for the invention is shown in FIG. 4B. At the lowermost end of the receiver coil section of the coil mandrel unit 8 can be an X-axis receiver coil RX. Coil RX can be wound so that its sensitive direction is parallel to axis X1 as for transmitter coil TX (shown in FIG. 4A). Eddy currents flowing in ground loops corresponding to coil TX will induce voltages in coil RX proportional in magnitude to the magnitude of the previously explained TX-related eddy currents. The eddy currents themselves are proportional to the electrical conductivity in the path of these ground loops.

A short distance along the axis of the coil mandrel unit 8 is a Z-axis receiver coil RZ wound to have its sensitive direction substantially parallel to Z1, as for its corresponding transmitter TZ. Eddy currents flowing in the previously explained ground loops related to coil TZ will induce voltages in coil RZ proportional to the magnitude of these eddy currents.

The mandrel unit 8 can include a Y-axis receiver coil having a sensitive direction parallel to Y1 and is shown at RY. Eddy currents associated with coil TY will induce similar type voltages in coil RY.

The Tuning Procedure

Figure 1:
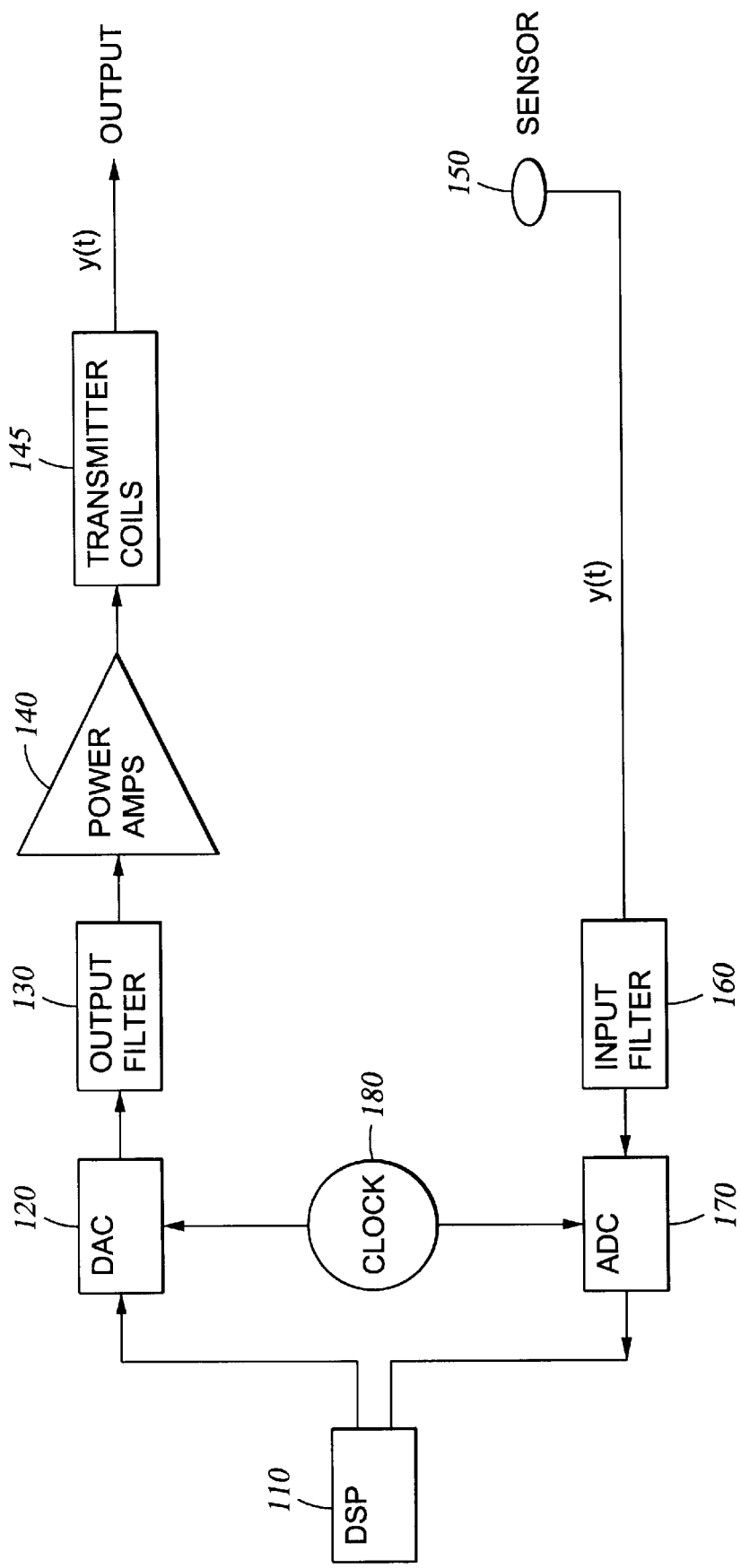
FIG. 1 shows a diagram of the hardware components used in the tuning procedure.

The tuning procedure is a method for transmitting a desired periodic signal as is required for well logging. FIG. 1 illustrates the generic hardware used in the embodiment of the procedure, which comprises a digital signal processing unit (DSP) 110 with attached memory, a digital to analog converter (DAC) 120, an output filter 130, a plurality of power amplifiers 140, a plurality of transmitter coils 145, a signal sensor 150, an input filter 160, an analog to digital converter (ADC) 170, and a common digital clock 180. Furthermore, the associated electronics are capable of operation in an environment in which the temperature may reach 175C. The largest source of distortion to the signal comes from the power amplifiers 140. In the context of well logging, the input to the power amplifiers should be adjusted such that the signal from the power amplifiers has very low distortion compared to the desired signal (e.g., −40 dB or better).

Figure 2:
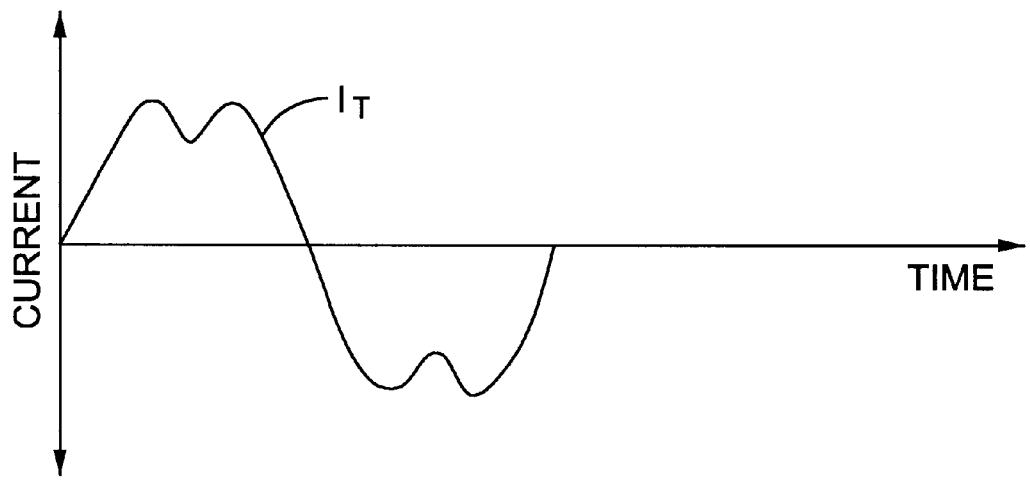
FIG. 2 shows a graph of the waveform of the transmitter current for one embodiment.
Figure 3:
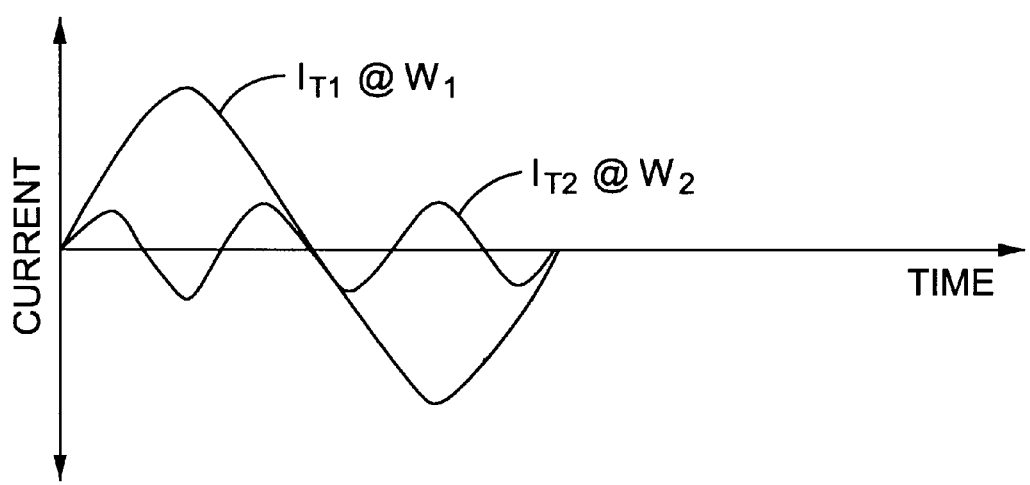
FIG. 3 shows a graph of the waveforms of the two frequencies which comprise the transmitted waveform.

The desired periodic signal is specified in the memory as a set of amplitudes of sines and cosines at known frequencies that are harmonics of the fundamental signal frequency (i.e. a Fourier series representation). An example of a suitable frequency for fundamental signal frequency is 20 kHz. A graph of an example of a periodic signal suitable for use in well logging is depicted in FIG. 2. A graph of the fundamental frequency and third harmonic (whose addition creates the periodic signal depicted in FIG. 2) is shown in FIG. 3. The ratio of the harmonic frequency to the fundamental frequency in this example is 3 to 1. However, other ratios of the harmonic frequency to the fundamental frequency could be used as well including such ratios such as 2 to 1 and 3 to 2. The DSP 110 creates samples of one period of the desired signal by summing samples of the constituent sines and cosines, each weighted by the specified amplitude. An example of an appropriate sampling rate is 1 MHz. The DSP 110 then repetitively writes the samples of this single period to the DAC 120, which converts the digital inputs from the DSP 110 into an analog signal feeding the output filter 130. The output filter 130 converts the discrete, step-like output of the DAC 120 into a smooth analog signal suitable for amplification and transmission by the power amplifier 140.

Now even though the DSP 110 has created the specified signal, the output filter 130 and power amplifier 140 will always produce an output that differs, perhaps substantially, from the specified signal because they have frequency dependent gain (i.e. non-flat gain versus frequency), frequency dependent delay and dispersion (i.e. non-linear phase response) and they introduce harmonics (i.e., their non-linear input-output relation causes harmonic distortion). The innovative procedure compensates for the effects of these imperfect transmitter components in the transmitted signal.

The transmitted signal produced by the transmitter coils 145 is sensed by the signal sensor 150 and routed back to the DSP 110 via an optional input filter 160 for noise rejection and an ADC 170 to convert the analog signal back into digital format. The ADC 170 shares a digital clock 180 with the DAC 120 to ensure synchronization. The DSP 110 decomposes the samples of one period of the transmitted signal into the corresponding sine and cosine amplitudes (i.e. a Fourier analysis) and compares these against the specified, desired amplitudes. The template of the samples of the waveform to be transmitted is then modified so that amplitudes that are deficient are enhanced and those that are excessive are reduced. Because both sine and cosine components are adjusted, phase shifts in the output filter 130 and power amplifier 140 are corrected, as well as are gain errors. Harmonics introduced by the non-linearities in the transmitter are also corrected by the addition of harmonics of opposite polarities into the template. The adjustment of the template is performed using a steepest descent adaptation of the sine and cosine amplitudes.

Detailed Description of the Tuning Procedure

The innovative procedure is described using the example of an induction logging tool that transmits a signal composed of a fundamental sinusoid and its third harmonic. Say an induction logging tool is required to transmit the waveform, s(t), as shown in FIG. 2 and defined by $$s(t) = A_1 \sin \omega_1 t + A_3 \sin 3\omega_1 t \quad \text{(EQ 1)}$$

where $\omega_1$ is the fundamental angular frequency in radians per second, $a_1$ is the amplitude of the fundamental component, and $a_3$ is the amplitude of the third harmonic of the fundamental. This signal is obviously periodic with period, T, given in seconds by $$T = 2\pi/\omega_1. \quad \text{(EQ 2)}$$

Samples of s(t) taken at time interval $\Delta t$ apart are expressed as $s(n\Delta t)$ such that $$s(n\Delta t) = A_1 \sin \omega_1 n\Delta t + A_3 \sin 3\omega_1 n\Delta t \quad \text{(EQ 3)}$$

where n is the sample index, and, for an integer number of samples, N, to exactly represent one period of s(t), we must have $$N\Delta t = T \quad \text{(EQ 4)}$$

or, equivalently, the frequency of the fundamental and the sampling rate, $f_g$, of the DAC 120 and ADC 170 (the reciprocal of the sampling interval) must satisfy $$f_s 1/\Delta t = N/T = N\omega_1/2\pi. \quad \text{(EQ 5)}$$

This says that the sampling rate should be an integer multiple of the fundamental frequency. With this choice, an integer number of cycles of the fundamental and all its harmonics up to the $(N/2-1)^{th}$ harmonic will be exactly contained in the period T (the limitation on the highest representable harmonic is due to the well known sampling theorem).

As a concrete example, an induction logging tool may wish to transmit a fundamental at 10 kHz combined with a third harmonic at 30 kHz whose amplitude is 0.577 times that of the fundamental so their ratio of powers is 3 to 1. The sampling frequency of the DAC 120 and ADC 170 can be chosen as 1.28 Mhz or 128 times the fundamental frequency, so all harmonics of 10 kHz up to 630 kHz can be represented, and hence controlled, by the DSP 110. The template of the signal within the DSP 110 that represents one period of the fundamental must then contain 128 sample. For this example, $\omega_1 = 2\pi \times 10$ kHz, $A_1 = 1$, $A_3 = 0.577$, and N=128.

Operation of the innovative procedure proceeds as follows. The DSP 110 constructs the template of one cycle of the desired waveform using a set of programmed amplitudes $\{a_k, b_k\}$, where the bracket notation $\{\}$ indicates a set, according to $$s(n\Delta t) = \sum_{k=1}^{\frac{N}{2}-1} a_k \sin(k\omega_1 n\Delta t) + b_k \cos(k\omega_1 n\Delta t) \quad \text{(EQ 6)}$$

for sample index n=1 to N and harmonics k=1, . . . N/2-1. Initially, the programmed sine and cosine amplitudes $\{a_k, b_k\}$ may be set equal to the specified desired amplitudes $\{A_k, B_k\}$ but, by a method to be subsequently disclosed, will be modified during the operation of the procedure (in the cited example, initially $a_1=1$, $a_3=0.577$, and all other $a_k$ and $b_k$ are zero). The template is then fed from the DSP 110 to the DAC 120 starting with n=1 and continuing through n=N, after which the first sample is again output and so on.

Now the DAC 120 analog output is subjected to the transfer function of the output filter 130 and the power amplifier 140, and there is also a possibility that unwanted harmonics may be created by non-linearities in these analog components. It is a purpose of the innovative procedure to determine and correct this corruption so that the output of the power amplifier 140 is substantially identical to the desired signal, s(t).

The nature of the corruption is determined by the DSP 110 by inspecting samples of the actual output signal, y(t) in FIG. 1, as sensed by a sensor 150 whose output is sampled by the ADC 170. One period of the output signal is decomposed in the DSP 110 by Fourier analysis according to $$\overline{A_k} = \frac{2}{N} \sum_{n=1}^{N} y(n\Delta t) \sin(k\omega_1 n\Delta t) \quad \text{(EQ 7)}$$

$$\overline{B_k} = \frac{2}{N} \sum_{n=1}^{N} y(n\Delta t) \cos(k\omega_1 n\Delta t) \quad \text{(EQ 8)}$$

for harmonics k=1, . . . N/2-1, though in practice, some reduced subset of frequencies may be used.

The initially measured amplitudes $\{\overline{A_k}, \overline{B_K}\}$ will not be identical to the programmed amplitudes $\{a_k, b_k\}$ because of the aforementioned analog transfer function and harmonic distortion. First, consider the transfer function's effect on $\{\overline{A_k}, \overline{B_k}\}$. If the analog transfer function at frequency $k\omega_1$ has a phase shift $\phi$ and a gain G, then the measured signal at this frequency will be $$Ga_k \sin(k\omega_1 t + \phi) + Gb_k \cos(k\omega_1 t + \phi) \quad \text{(EQ 9)}$$

which can be expanded using elementary trigonometric identities as $$(Ga_k \cos(\phi) - Gb_k \sin(\phi)) \sin(k\omega_1 t) + (Ga_k \sin(\phi) + Gb_k \cos(\phi)) \cos(k\omega_1 t) \quad \text{(EQ 10)}$$

The first term is the measured sine component and the second term the measured cosine component:

$$\overline{A_k} = (G \cos \phi) a_k - (G \sin \phi) b_k \quad \text{(EQ 11)}$$

$$\overline{B_k} = (G \sin \phi) a_k + (G \cos \phi) b_k \quad \text{(EQ 12)}$$

The factors $G\cos(\phi)$ and $G\sin(\phi)$ for each frequency describe the effects of the output filter 130 and power amplifier 140 transfer function.

The second effect that prevents the measured amplitudes $\{\overline{A_k}, \overline{B_k}\}$ from being identical to the programmed amplitudes $\{a_k, b_k\}$ is harmonic distortion, which is the creation of new harmonics due to non-linearities in the analog hardware. Harmonic distortion's key feature is that it appears at a different frequency (a harmonic of) the signal being distorted. Thus when measuring a given frequency as in equations 11 and 12, harmonic distortion appears as an additional noise term that is neither a function of $a_k$ nor $b_k$:

$$\overline{A_k} = (G \cos \phi)a_k - (G \sin \phi)b_k + H_{Ak} \quad \text{(EQ 13)}$$

$$\overline{B_k} = (G \sin \phi)a_k + (G \cos \phi)b_k + H_{Bk} \quad \text{(EQ 14)}$$

where $H_{Ak}$ and $H_{Bk}$ are the unwanted sine and cosine harmonics, respectively, created at frequency $k\omega_1$ due to distortion of components at all other frequencies.

Even if the non-linearity of the analog hardware and its transfer function were known, it would be impractical to directly solve the set of equations 13 and 14 for all frequencies so as to generate a desired output signal. The innovative procedure overcomes this problem by iterating and adapting the set of sine and cosine amplitudes that are used to create the signal template. Rather than constantly using the desired amplitudes $\{A_k, B_k\}$, a new set of programmed amplitudes, $\{a_k, b_k\}$ is used to create the template, and, at each iteration, $\{a_k, b_k\}$ is adapted so that the measured $\{\overline{A_k}, \overline{B_k}\}$ more closely match the desired $\{A_k, B_k\}$.

The adaptation substantially eliminates both the transfer function effects (Gcos$\phi$ and Gsin$\phi$ in equations 13 and 14) and the distortion terms ($H_{Ak}$ and $H_{Bk}$) by the well known steepest descent adaptation procedure. The steepest descent method adapts $\{a_k, b_k\}$ at each iteration along the direction of the negative gradient of the squared error in $\{\overline{A_k}, \overline{B_k}\}$ relative to $\{A_k, B_k\}$. The squared error, $E^2_k$, is defined as $$E_k^2 \equiv [(\overline{A_K} - A_K)^2 + (\overline{B_K} - B_K)^2] \equiv E_{Ak}^2 + E_{Bk}^2 \quad \text{(EQ 15)}$$

where $$E_{Ak} \equiv \overline{A_k} - A_k \quad \text{(EQ 16)}$$

$$E_{Bk} \equiv \overline{B_k} - B_k \quad \text{(EQ 17)}$$

Then, adaptation by steepest descent adjusts $\{a_k, b_k\}$ according to $$a_{k_{new}} = a_{k_{old}} - \alpha \frac{\partial}{\partial a_k}(E_k^2) = a_{k_{old}} - \alpha \left(2E_{Ak}\frac{\partial E_{Ak}}{\partial a_k} + 2E_{Bk}\frac{\partial E_{Bk}}{\partial a_k}\right) \quad \text{(EQ 18)}$$

where the subscripts "old" and "new" refer to the values of $a_k$ before and after the adjustment, respectively, $\alpha$ is the adjustment proportionality factor, and the similar equation 19 holds for $b_k$:

$$b_{k_{new}} = b_{k_{old}} - \alpha \frac{\partial E_k^2}{\partial b_k} = b_{k_{old}} - \alpha \left(2E_{Ak}\frac{\partial E_{Ak}}{\partial b_k} + 2E_{Bk}\frac{\partial E_{Bk}}{\partial b_k}\right) \quad \text{(EQ 19)}$$

In equation 18, $a_{k_{old}}$ and $\alpha$ are known, $E_{Ak}$ and $E_{Bk}$ can be simply calculated from equations 16 and 17, and only the partial derivatives remain to be found. These can be found either by approximating the derivatives as the ratio of differences or by measuring the transfer function.

The differences needed for the derivatives' approximations can be measured when the adjustment of $\{a_k, b_k\}$ is broken into two steps: first adjust $\{a_k\}$ then adjust $\{b_k\}$. When $a_k$ is changed from $a_{k_{old}}$ to $a_{k_{new}}$, with $b_k$ held constant, the partial derivatives are simply estimated as $$\frac{\partial E_{Ak}}{\partial a_k} \approx \frac{\Delta E_{Ak}}{\Delta a_k} = \frac{E_{Ak_{new}} - E_{Ak_{old}}}{a_{k_{new}} - a_{k_{old}}} \quad \text{(EQ 20)}$$

$$\frac{\partial E_{Bk}}{\partial a_k} \approx \frac{\Delta E_{Bk}}{\Delta a_k} = \frac{E_{Bk_{new}} - E_{Bk_{old}}}{a_{k_{new}} - a_{k_{old}}} \quad \text{(EQ 21)}$$

Similarly, when $b_k$ is changed from $b_{k_{old}}$ to $b_{k_{new}}$, with $a_k$ held constant, the partial derivative estimates are $$\frac{\partial E_{Ak}}{\partial b_k} \approx \frac{\Delta E_{Ak}}{\Delta b_k} = \frac{E_{Ak_{new}} - E_{Ak_{old}}}{b_{k_{new}} - b_{k_{old}}} \quad \text{(EQ 22)}$$

and $$\frac{\partial E_{Bk}}{\partial b_k} \approx \frac{\Delta E_{Bk}}{\Delta b_k} = \frac{E_{Bk_{new}} - E_{Bk_{old}}}{b_{k_{new}} - b_{k_{old}}} \quad \text{(EQ 23)}$$

As a preferred alternative, the analog transfer function with gain G and phase shift $\phi$ can be related to the partial derivatives of equations 16 and 17 by equations 13 and 14. Because the desired amplitudes $\{A_k, B_k\}$ in equations 16 and 17 are constants, $$\frac{\partial E_{Ak}}{\partial a_k} = \frac{\partial \overline{A_k}}{\partial a_k} = G\cos\phi \equiv ss \quad \text{(EQ 24)}$$

$$\frac{\partial E_{Ak}}{\partial b_k} = -G\sin\phi \equiv sc \quad \text{(EQ 25)}$$

$$\frac{\partial E_{Bk}}{\partial a_k} = G\sin\phi = -sc \quad \text{(EQ 26)}$$

$$\frac{\partial E_{Bk}}{\partial b_k} = G\cos\phi = ss \quad \text{(EQ 27)}$$

where "ss" and "sc" are simplified notations for the partial derivatives. But equations 11 and 12 show that these can be directly measured by injecting a pure cosine (setting $a_k$ to zero) and measuring the output Fourier components:

$$\frac{\overline{A_k}}{b_k} = -G\sin\phi = sc \quad \text{(EQ 28)}$$

$$\frac{\overline{B_k}}{b_k} = G\cos\phi = ss \quad \text{(EQ 29)}$$

An advantage of measuring sc and ss prior to starting the iterations of equations 18 and 19 is that the initial values of $\{a_k, b_k\}$ can be chosen so that if the system were strictly linear (no harmonic distortion), then the output would be the desired $\{A_k, B_k\}$. It can be seen by direct substitution into the linear system equations (equations 11 and 12) of $$a_k = A_k \frac{ss}{G^2} - B_k \frac{sc}{G^2} \quad \text{(EQ 30)}$$

$$b_k = B_k \frac{ss}{G^2} + A_k \frac{sc}{G^2} \quad \text{(EQ 31)}$$

with $$G = \sqrt{ss^2 + sc^2} \quad \text{(EQ 32)}$$

that the desired $\{A_k, B_k\}$ would be produced; this is an excellent starting point for the iteration.

Tuning Procedure Summary

The method with direct measurement of the analog transfer function (as implemented in an induction logging tool) is summarized as:

1. Specify a desired periodic waveform in its Fourier series representation as a set of sine and cosine amplitudes $\{A_k, B_k\}$ at the fundamental frequency and its harmonics.
2. Measure the analog transfer function at the fundamental frequency and its harmonics and calculate the partial derivatives by equations 24 through 27.
3. Initialize a programmable set of sine and cosine amplitude $\{a_k, b_k\}$ according to equations 30 and 31.
4. Synthesize time domain samples from the programmed Fourier amplitudes $\{a_k, b_k\}$ and repetitively output these from the DAC 120, output filter 130 and power amplifier 140.
5. Sample the analog output from the power amplifier 140 using an ADC 170.
6. Analyze the time domain output samples into their Fourier sine and cosine amplitudes.
7. Calculate the errors in the Fourier amplitudes by using equations 16 and 17.
8. If all errors are beneath a specified tolerance in absolute value, the waveform is as desired and the method terminates.
9. Otherwise, adjust the amplitudes $\{a_k, b_k\}$ for the lowest frequency whose errors are greater than the tolerance. (Alternatively, the amplitudes $\{a_k, b_k\}$ for all frequencies whose errors are greater than the tolerance can be adjusted).
10. Jump back to step 4.

The method without direct measurement of the analog transfer function is summarized as:

1. Specify a desired periodic waveform in its Fourier series representation as a set of sine and cosine amplitudes $\{A_k, B_k\}$ at the fundamental frequency and its harmonics.
2. Initialize a programmable set of sine and cosine amplitudes $\{a_k, b_k\}$ so that they equal the desired amplitudes $\{A_k, B_k\}$.
3. Initialize the estimated partial derivative using some rough estimate of the analog components' transfer function; a nominal gain value and a phase of zero is a practical choice.
4. Synthesize time domain samples from the programmed Fourier amplitudes $\{a_k, b_k\}$ and repetitively output these from the DAC 120, output filter 130 and power amplifier 140.
5. Sample the analog output from the power amplifier 140 using an ADC 170.
6. Analyze the time domain output samples into their Fourier sine and cosine amplitudes.
7. Adjust the set of sine amplitudes $\{a_k\}$ for all frequencies k by using equation 18.
8. Output and measure a new analog waveform by repeating steps 4, 5, and 6.
9. Adjust the set of cosine amplitudes $\{b_k\}$ for all frequencies k by using equation 19. Also, update the estimates of the partial derivatives with respect to $a_k$ using equations 20 and 21.
10. Output and measure a new analog waveform by repeating steps 4, 5, and 6.
11. Adjust the set of sine amplitudes $\{a_k\}$ for all frequencies k by using equation 18. Also, update the estimates of the partial derivatives with respect to $b_k$ using equations 22 and 23.
12. If all errors calculated by equations 16 and 17 are beneath a specified tolerance in absolute value, the waveform is as desired and the method terminates.
13. Otherwise, jump back to step 8.

The method is thus an adjustment of $a_k$ and the derivatives with respect to $b_k$ alternating with an adjustment of $b_k$ and the derivatives with respect to $a_k$.

Sampling the Transmitted Signal

The innovative procedure operates by adjusting the transmitted signal so that the samples of the transmitted signal take the desired form. The samples must be taken, therefore, at an appropriate point in the device of which the procedure is a part without introducing distortions due to sampling. In the aforementioned induction logging tool that uses a transmitter coil to send a magnetic signal into a rock formation and a receiver coil and receiver electronics to detect the magnetic signal having passed through the formation, the preferred method of sampling the transmitted signal involves sampling after the signal has passed through as much of the receiver system as practical. Four alternative techniques for transmitted signal sampling are described in the following sections and differ by how much of the receiver subsystem is included prior to sampling.

Transmitter Current or Voltage Sampling

The current applied to the transmitter coil may be sampling using an ADC 170 and, for example, a toroidal current sensor 150 around the current-feeding wires to the transmitter, or by other techniques well known to electronics engineers. Similarly, the voltage applied to the transmitter coil may be sampled. This technique can ensure that the transmitted signal is as desired, but does nothing to remove the effects of the receiver transfer function on the received signal.

Injection of the Transmitted Signal into the Receiver Electronics

The input to the receiver electronics can be selected by a switch from either the primary receiver sensor (e.g. the receiver coil for an induction logging tool) or from a secondary receiver sensor designed to receive the transmitted signal directly (i.e. the signal that has not passed through the rock formation but traveled by a direct path from the transmitter to the sensor). An example of a secondary receiver sensor is one or a few turns of wire wrapped around but insulated from the transmitter coil. A system using the procedure would switch to the secondary receiver sensor to sample the signal and adjust the transmitter signal, and subsequently switch to the primary receiver sensor in normal operation (e.g. when an induction tool is logging the rock formation). The advantage of this technique is that the transfer function of the receiver electronics is eliminated by the adjustment of the transmitter.

Auxiliary Receiver Channel Sampling

The receiver channel sensor and electronics can be duplicated by an auxiliary receiver channel that has its sensor positioned so as to sense only the transmitted signal (e.g. for the induction logging tool, the signal that has not passed through the rock formation but traveled by a direct path from the transmitter to the auxiliary sensor). The sampling of such an auxiliary channel and the adjustment of the transmitter can be simultaneous with the normal (logging) operation of the system. The fidelity of the received signal is, however, only as good as is the replication of the primary receiver channel in the auxiliary receiver channel.

Transmitter Modification

In some applications, it is possible to switch some property of the transmitter so that the transmitted signal first goes directly into the primary receiver sensor for transmitter adjustment and is later switched to another path for its normal operation. In an induction logging tool, the transmitter coil is typically divided into two physically separate coils, called a primary coil and a bucker coil, that are normally operated so that their summed magnetic fields are maximized in the rock formation being measured and minimized along the tool axis. When used with the procedure, the bucker coil may be temporarily disabled so that the resulting field from the primary transmitter coil is maximized along the tool axis and dominates the receiver input, thus providing a signal suitable for transmitter adjustment. The bucker coil would then be enabled for normal logging. Such an arrangement corrects the transmitter signal to remove imperfections from the transmitter, receiver sensor, and receiver electronics.

Example of Hardware Configuration

Figure 7:
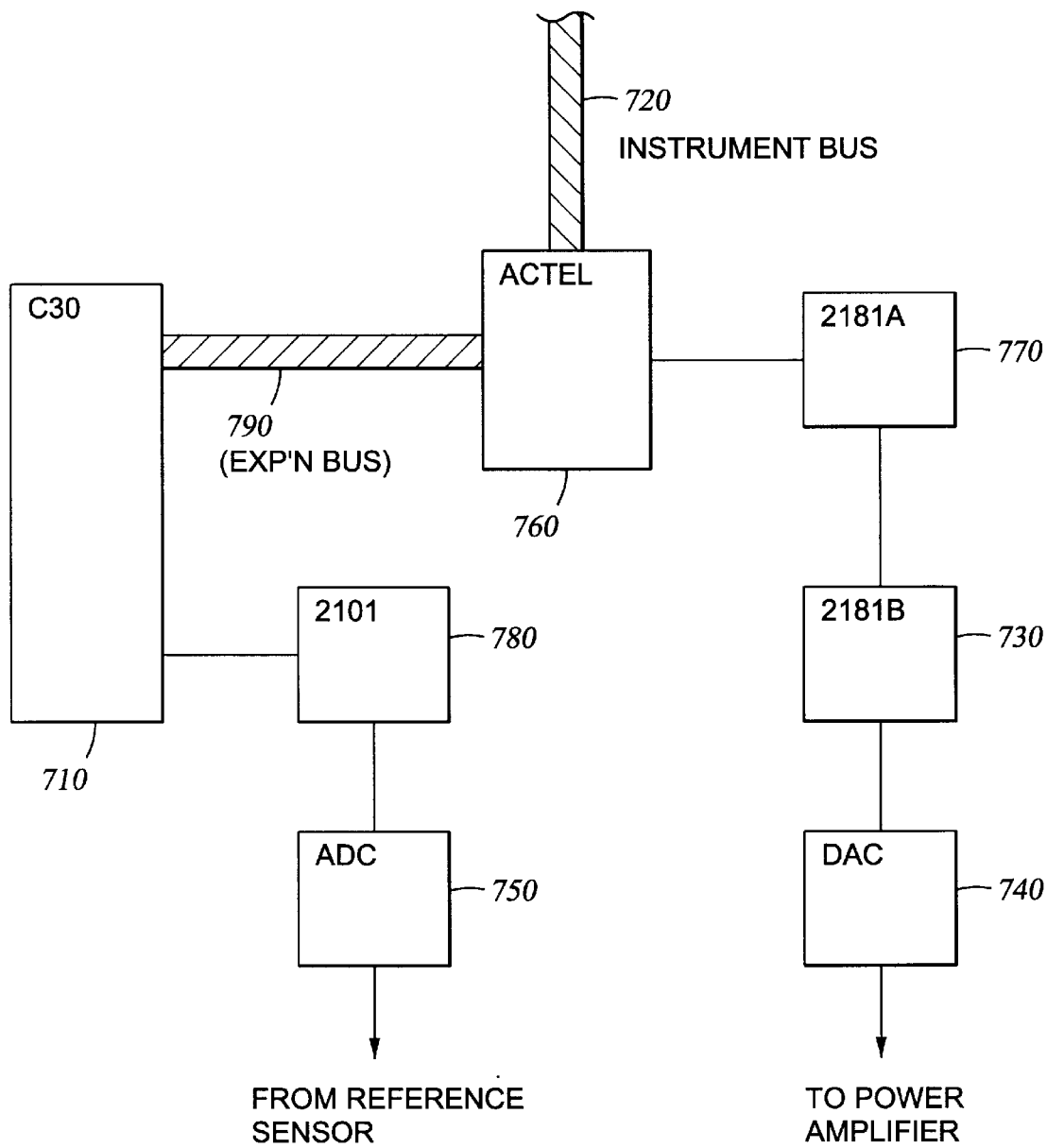
FIG. 7 shows a sample embodiment for the hardware used in implementing the tuning method.

FIG. 7 illustrates a specific hardware configuration suitable for implementing the tuning procedure and is given by way of example only and in no way limits the scope of the patent. Those skilled in the relevant art will readily see other approaches to implementing the tuning procedure. Commands are received from the surface via the instrument bus 720. A Texas Instrument TMS320C30 floating point digital signal processor (C30) 710 is used as the DSP 110. The C30 720 is the master controller and sets the frequency list. The list of synthesized inputs is given to the Analog Devices ADSP 2181B 730 which then feeds the waveform into the DAC 740. The ADC 750 receives an unfiltered signal from a magnetic field sensor and must be synchronized with the DAC 740. The C30 710 is connected by an expansion bus 790 to the Actel 760 which is connected to an Analog Devices ADSP 2181A DSP 770 which is connected to the ADSP 2181B DSP 730. The reference receiver 780, an Analog Devices ADSP-2101 fixed point digital signal processor, is connected to the ADC 750 and must also be synchronized to the DAC 740. The reference receiver 780 must start with the DAC at sample number zero.

According to a disclosed class of innovative embodiments, there is provided: A well logging method for characterizing rock formations, comprising the steps of: (a.) synthesizing a waveform according to a synthesizer specification which substantially matches a desired specification; (b.) generating a power signal from said waveform; (c.) sampling said power signal and comparing the sampled power signal to said waveform; (d.) iteratively adjusting said synthesizer specification until said power signal substantially resembles said waveform; (e.) transmitting the adjusted power signal through a medium; (f.) receiving an induced signal created from the transmission of the adjusted power signal into said medium; and (g.) processing said induced signal to derive information.

According to another disclosed class of innovative embodiments, there is provided: A well logging method for characterizing rock formations, comprising the steps of: (a.) synthesizing a waveform according to a synthesizer specification which substantially matches a desired specification which requires precise phase and power relationships; (b.) generating a power signal from said waveform, said power signal being capable of travelling through a rock formation; (c.) sampling said power signal and comparing the sampled power signal to said waveform; (d.) iteratively adjusting said synthesizer specification until said power signal substantially resembles said waveform; (e.) transmitting the adjusted power signal through rock formations; (f.) receiving an induced signal created from the transmission of the adjusted power signal into the rock formations; and (g.) processing said induced signal to derive information.

According to another disclosed class of innovative embodiments, there is provided: A waveform generator, comprising: a waveform synthesizer, which outputs a synthesized waveform according to a copy of a waveform specification; a power amplifier functionally connected to be driven in accordance with said synthesized waveform; control circuitry which is connected to monitor the output of said power amplifier, and to iteratively adjust said copy of said waveform specification to minimize differences between said output of said power amplifier and said waveform specification; wherein said power amplifier can include unpredictable nonlinearities, which are compensated by said control circuitry.

According to another disclosed class of innovative embodiments, there is provided: A method of synthesizing a desired waveform, comprising the steps of: (a.) specifying a desired waveform; (b.) creating a digital waveform matching said desired waveform; (c.) converting said desired waveform to an analog waveform; (d.) amplifying said analog waveform to produce an amplified waveform; (e.) sampling said amplified waveform; (f.) comparing said amplified waveform to said desired waveform; (g.) iteratively adjusting said digital waveform until said amplified waveform substantially resembles said desired waveform.

U.S. Pat. No. 5,781,436 issued to Forgang et al., which is hereby incorporated by reference, provides additional detail regarding possible implementations of the disclosed embodiments, and of modifications and variations thereof.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, other gradient and iterative methods are possible in place of the steepest descent method and other representations of the waveform other than by sine and cosine are possible.

The method of Fourier analysis can be replaced by direct correlation with tabulated or calculated sines and cosines, or by any of the well known fast Fourier transform methods, or the Goertzel method. Waveform synthesis can use either tabulated or calculated sines and cosines and may or may not use either digital or analog output filters. Additionally, the use of Fourier analysis and synthesis may be replace by other suitable analysis- synthesis methods, including wavelet methods.

The adjustment method and estimation of derivatives may also be modified by digital filtering or averaging. The derivative estimation by dividing differences may be replaced by other methods of numerical differentiation such as are well known to those skilled in the art of numerical analysis. Further, a variation of the estimation of the derivatives may use the symmetry inherent in the derivative equations 20 through 23, where two derivatives are equal and the other two are equal in magnitude but of opposite polarity, so that pairs of derivatives are estimated jointly.

Another possible variation of the procedure is its operation as two distinct phases: the first phase would determine the derivatives by intentionally changing the programmed sine and cosine amplitudes, and the second phase would initialize and adapt the programmed amplitudes to the desired amplitudes.

The use of the input filter 160 between the signal sensor 150 and the ADC 170 is optional. It is noteworthy, however, that the procedure is particularly advantageous when this input filter 160 is identical to the filtering applied in the receiver or measurement section of the logging tool that captures the signal after it has passed though the rock formation. In this case, the procedure effectively removes not only the corrupting effects of the transmitter output filter and power amplifier 140, but removes the corrupting effects of the receiver input filter 160 as well.

It should be noted that although the innovative concepts of the present application have been described with particular reference to a method of steepest descent procedure, it will be obvious to those skilled in the relevant art that other iterative and gradient methods may be substituted for the method of steepest descent. It should be further noted, that although the novel inventive teachings of the present application have been described in the context the Forgang et al. method of well logging, the application may also be used with conventional induction logging instruments which transmit sinusoidal, or square wave (see the Beard et al. patent) signals into the earth formations. Other applications, not related to well logging, requiring pure signal generation (such as with test equipment) are possible as well and will be obvious to those skilled in the art.

What is claimed is:

1. A downhole characterization method, comprising the steps of:
   (a.) synthesizing a waveform according to a synthesizer recipe which substantially matches a desired waveform specification;
   (b.) amplifying said waveform in a downhole power amplifier, to produce an RF power signal;
   (c.) sampling said power signal, and iteratively adjusting said synthesizer recipe to reduce dissimilarities between said power signal and said waveform specification; and
   (d.) transmitting said RF power signal through a medium to be characterized, and receiving an induced signal created from the transmission of said power signal into said medium.

2. The method of claim 1, wherein said iteratively adjusting step uses a gradient method.

3. The method of claim 1, wherein said iteratively adjusting step uses the method of steepest descent.

4. The method of claim 1, wherein said step of sampling said power signal uses a first receiver, and said step of receiving uses a second receiver which is spatially separated from said first receiver.

5. The method of claim 1, wherein all of said steps are performed inside a borehole.

6. The method of claim 1, wherein said synthesizer recipe consists of discrete components in a transform-domain representation.

7. The method of claim 1, wherein said synthesizer recipe consists of discrete harmonically-related frequency components.

8. The method of claim 1, wherein said synthesizer recipe consists of a Fourier-series representation.

9. The method of claim 1, wherein said synthesizer recipe initially includes no quadrature components, but can be adjusted by said adjusting step to include quadrature components.

10. A well logging method for characterizing rock formations, comprising the steps of:
    (a.) synthesizing a waveform according to a synthesizer specification which substantially matches a desired recipe which requires precise phase and power relationships;
    (b.) generating a power signal from said waveform, said power signal being capable of travelling through a rock formation;
    (c.) sampling said power signal and comparing the sampled power signal to said recipe;
    (d.) iteratively adjusting said synthesizer specification until said power signal substantially resembles said recipe;
    (e.) transmitting the adjusted power signal through rock formations;
    (f.) receiving an induced signal created from the transmission of the adjusted power signal into the rock formations; and
    (g.) processing said induced signal to derive information.

11. The method of claim 10, wherein said iteratively adjusting step uses a gradient method.

12. The method of claim 10, wherein said iteratively adjusting step uses the method of steepest descent.

13. The method of claim 10, wherein all of said steps are performed inside a well hole.

14. The method of claim 10, wherein said specifying a desired waveform step is performed by specifying the waveform in its Fourier series representation.

15. The method of claim 10, wherein said step (d.) uses a Fourier analysis in the iterative process.

16. A waveform generator, comprising:
    a waveform synthesizer, which outputs a synthesized waveform according to a copy of a waveform recipe;
    a power amplifier functionally connected to be driven in accordance with said synthesized waveform;
    control circuitry which is connected to monitor the output of said power amplifier, and to iteratively adjust said copy of said waveform specification to minimize differences between said output of said power amplifier and said waveform recipe;
    wherein said power amplifier can include unpredictable nonlinearities, which are compensated by said control circuitry.

17. The waveform generator of claim 16, wherein said control circuitry is connected to a receiver coil which is not DC-coupled to said power amplifier.

18. The waveform generator of claim 16, wherein said waveform specification covers only separated frequencies.

19. A method of synthesizing a desired waveform, comprising the steps of:
    (a.) specifying a desired waveform recipe;
    (b.) creating a digital waveform matching said desired waveform;
    (c.) converting said desired waveform to an analog waveform;
    (d.) amplifying said analog waveform to produce an amplified waveform;
    (e.) sampling said amplified waveform;
    (f.) comparing said amplified waveform to said desired waveform recipe;
    (g.) iteratively adjusting said digital waveform until said amplified waveform substantially resembles said desired waveform recipe.

20. The method of claim 19, wherein said step (g.) uses a Fourier analysis in said iteratively adjusting said digital waveform.

* * * * *